2,937,704

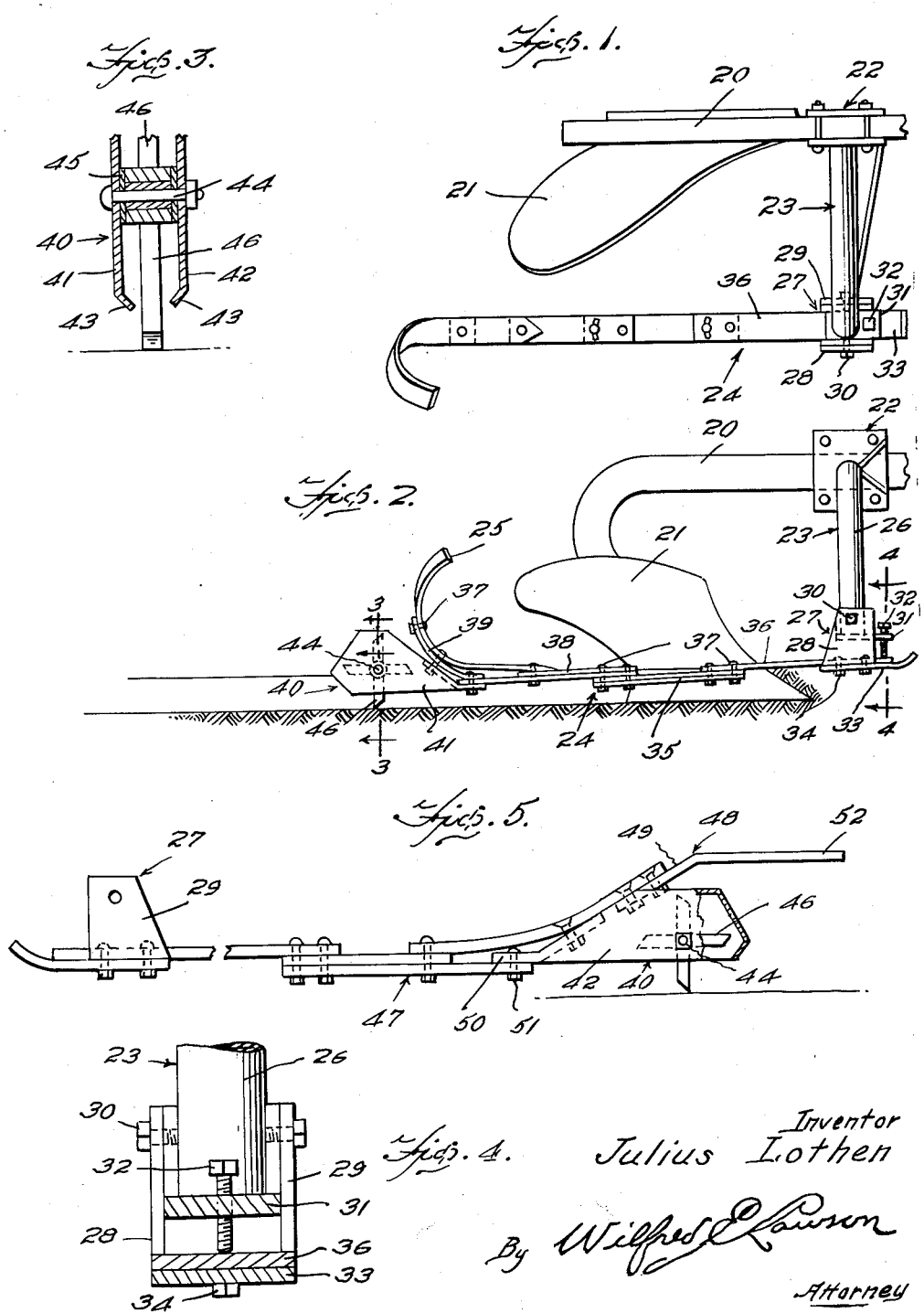

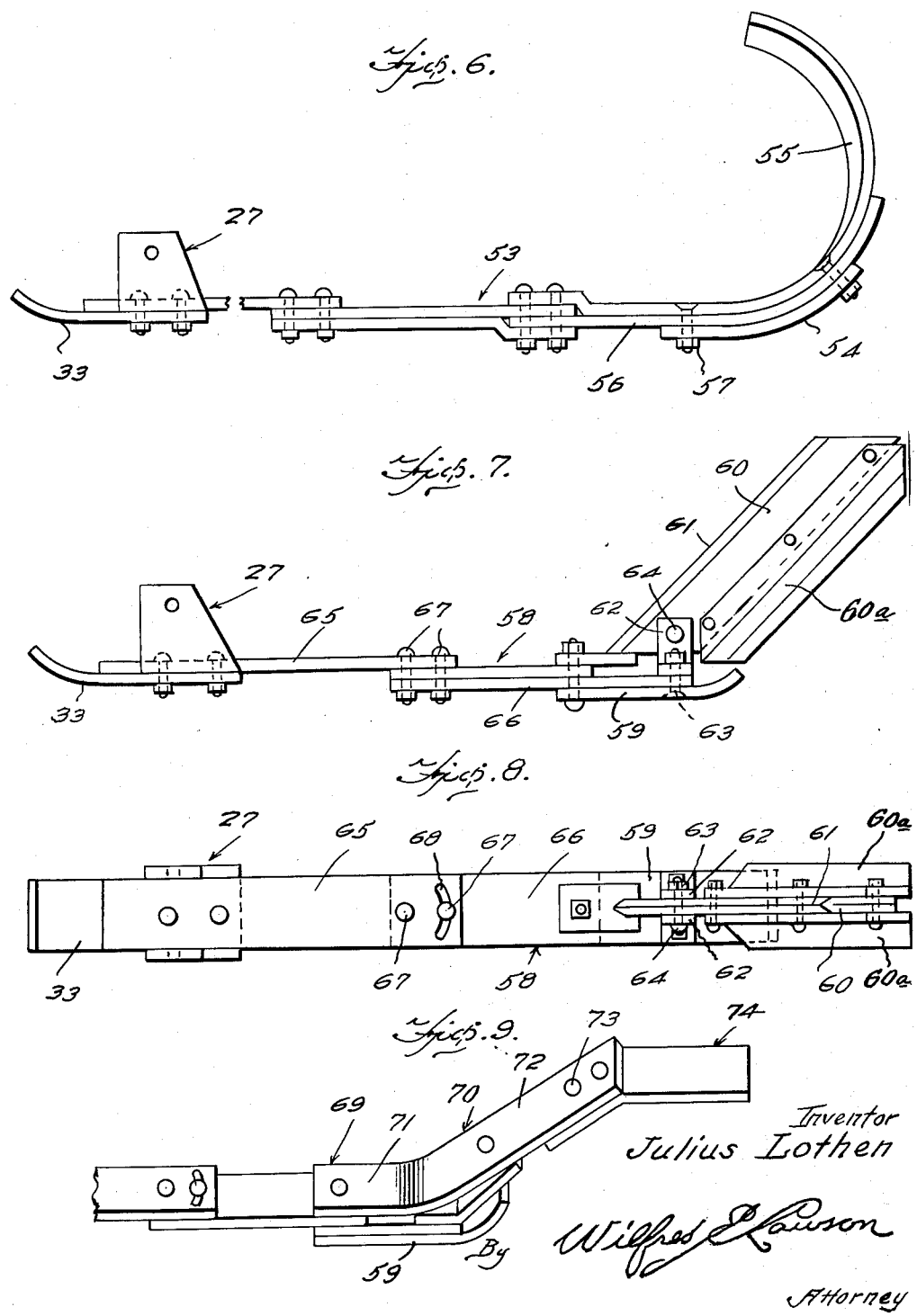

AGRICULTURAL IMPLEMENT

Julius Lothen, Winger, Minn.

Substituted for abandoned application Ser. No. 113,461, Aug. 31, 1949. This application Nov. 15, 1957, Ser. No. 698,319

1 Claim. (Cl. 172—67)

This invention relates to agricultural equipment, and more particularly to a tiller for working the soil that has been turned by a plow mold board.

This invention is an improvement on the invention disclosed and claimed in my Patent No. 2,572,625, issued July 31, 1951, and this application is a substitute for my application Serial No. 113,461, filed August 31, 1949, and now abandoned.

The object of the invention is to provide an implement for attachment to a tractor whereby soil that has been cut or lifted by the plow mold board will be worked or broken up so as to insure that the soil will be properly cultivated.

Another object of the invention is to provide a tiller which includes a cutting blade thereon so that as the tiller is drawn along the ground by a tractor or the like, the cutting blade will work or break up the soil that has been turned by the mold board.

A further object of the invention is to provide an agricultural implement which can be interchangeable as to tiller member arrangements and which also is extremely simple and inexpensive to manufacture.

Other objects and advantages will be apparent during the course of the following description.

In the accompanying drawings, forming a part of this application, and in which like numerals are used to designate like parts throughout the same:

Fig. 1 is a top plan view showing a plow mold board and the tiller of the present invention attached to a beam of a tractor;

Fig. 2 is a side elevational view of a modified tiller;

Fig. 3 is an enlarged sectional view taken on the line 3—3 of Fig. 2;

Fig. 4 is an enlarged sectional view taken on the line 4—4 of Fig. 2;

Fig. 5 is a side elevational view of another modified tiller;

Fig. 6 is a side elevational view of still another modified tiller;

Fig. 7 is a side elevational view of still another modified tiller;

Fig. 8 is a top plan view of the tiller of Fig. 7; and

Fig. 9 is a fragmentary perspective view of still another tiller.

Referring in detail to Fig. 1 of the drawings, there is shown a portion of a beam 20 which may project from the rear end of a tractor (not shown). Secured to the lower end of the beam 20 is a mold board 21 for turning the soil or cutting a furrow in the land. A clamp 22 connects an L-shaped arm 23 to the beam 20 and pivotally connected to the lower free end of the arm 23 is a tiller 24. The tiller 24 has an arcuate cutting blade 25 projecting from the rear end thereof, so that as the soil is turned by the mold board 21, this soil will fall onto the tiller 24 whereby the blade 25 will further work or break up the soil to insure proper cultivation.

Referring to Figs. 2, 3 and 4, there is shown a slightly modified agricultural implement which again includes the mold board 21 that is secured to the lower end of the tractor beam 20. The L-shaped arm 23 has one of its ends connected to the beam 20 by a clamp 22, while a hinge member 27 pivotally connects the front end of the tiller 24 to the vertical portion of the arm 23, this vertical portion of the arm being designated by the numeral 26. The hinge member 27 includes spaced parallel sidewalls 28 and 29 which are arranged on opposite sides of the vertical portion 26 of the arm 23, and a pin or bolt and nut assembly 30 pivotally or hingedly connects the hinge member 27 to the vertical portion 26.

The tiller 24 can be pivoted about a horizontal axis, and for causing this pivotal movement a plate 31 is secured, as by welding, to the bottom of the vertical portion 26 of the arm 23, Fig. 4. Carried by the plate 31 is a securing element, such as a set screw 32, and the lower end of the set screw 32 abuts or engages the front upper surface of the tiller 24. Thus, by properly rotating the set screw 32, the tiller 24 can be adjusted to any desired angle.

A guide plate 33 is secured to the front end of the tiller 24 by suitable securing elements, such as bolt and nut assemblies 34. The guide plate 33 has its front end curved upwardly or shaped arcuately so as to insure that the tiller will ride smoothly over any roots, holes in the ground, or other obstacles encountered in the open furrow in which the front portion of the tiller travels.

The tiller of Fig. 2 includes an enlongated body member which comprises a pair of superposed flat metal bars 35. Suitable securing elements, such as bolt and nut assemblies 37 connect a rod 36 to the front end of the bars 35. Further, the body member includes a pair of superposed arms or rods 38 which are secured to the rear end of the bars 35 by bolt and nut assemblies 37. A brace 39 is secured to one of the rods 38 and to the rear surfaces of the blade 25 by bolt and nut assemblies 37, brace 39 helping to prevent the blade 25 from being bent out of shape during use.

For supporting the rear end of the tiller, a housing 40 is provided. The housing 40 includes a pair of spaced parallel sidewalls 41 and 42 which each have their lower portion bent inwardly as at 43 so as to prevent dirt, weeds and the like from clogging up the rotating prongs or legs 46. Extending between the sidewalls 41 and 42 is a shaft 44 which has a bushing 45 arranged thereon, the legs 46 being mounted on a hub 46a that is supported on the bushing 45. The legs 46 have beveled ends and are spaced apart radially about the hub 46a so that they are rotated as the tiller in drawn along the furrow formed by the mold board and impart an up and down movement to the tiller and thereby increase the efficiency with which the blade 25 breaks up or works the soil.

Referring to Fig. 5, there is shown another modified tiller which is designed by the numeral 47. In the device shown in Fig. 5, a soil working member 48 is attached to the rear end of the tiller by suitable securing elements, such as bolt and nut assemblies 51. The soil working member 48 includes an intermediate inclined portion 49, the first portion 50 which is arranged angularly with respect to the intermediate portion 49, and a second portion 52 which is arranged in spaced parallel relation with respect to the first portion 50. The tiller 47 is adapted to be attached to the arm 23 by means of the hinge member 27 as previously described.

Referring to Fig. 6, there is shown another modified tiller which is designated by the numeral 53. The tiller 53 includes the hinge member 27 for pivotally connecting the tiller to the lower end of the arm 23, and the tiller 53 has an arcuate heel plate 54 which is adapted to engage the ground so as to support the rear end of the tiller. The tiller 53 has a blade 55 for working or pulverizing the soil that has been turned by the mold board, there being a bar 56 interposed between the blade 55 and the heel plate 54. Suitable securing elements, such as bolt and nut assemblies 57 connect the blade 55, bar 56 and heel plate 54 together.

Referring to Figs. 7 and 8, there is shown another modified tiller which is designated by the numeral 58. The tiller 58 includes a heel plate 59 supporting the rear end of the tiller, and for chopping up or working the soil, a vertically disposed blade 60 is provided with a longitudinally extending cutting edge 61. Secured to and extending longitudinally of the two sides of the blade 60 are laterally projecting auxiliary furrow spreaders 60a. A pair of brackets 62 are secured to the tiller 58 by bolt and nut assemblies 63, and suitable securing elements 64 secure the bracket 52 to the lower end of the blade 60 whereby the blade 60 will be maintained immobile on the tiller 58. The tiller 58 includes an elongated body member that comprises a pair of superposed bars 66, there being a rod 65 secured to the front of the bars 66 by bolt and nut assemblies 67. The rearmost of the bolt and nut assemblies 67 project through a slot 68 in the rod 65, so that by loosening the bolt and nut assembly 67, the blade 60 can be adjusted about a vertical axis as desired.

Referring to Fig. 9, there is shown another modified tiller which is designated by the numeral 69. The tiller 69 includes a ground engaging heel plate 59 and blade 70. The blade 70 includes a curved first section 71 and a second section 72 which is arranged angularly with respect to the first section 71. Suitable securing elements 73 connect a support member 74 to the upper end of the blade 70.

In use, the device of the present invention provides a means for working or breaking up the soil that has been turned or lifted by the mold board 21. Thus, the mold board 21 is secured to the tractor beam 20 and the tiller of the present invention is pivotally connected to the lower end of the arm 23 by the hinge member 27. By adjusting the set screw 32, the user can set or adjust the tiller about a horizontal axis. Thus, as the tractor moves along, the mold board 21 cuts a furrow and the soil is turned by the mold board 21 and guided onto the tiller of the present invention. In Fig 1, the tiller is shown provided with an arcuate cutting blade 25 which serves to break up or work the soil that is guided thereon by the mold board 21 so as to insure that the land is efficiently cultivated. In the tiller of Fig. 2, the rotatable legs 46 serve to impart an up and down motion on the tiller whereby the blade 25 will be moved through the soil so as to effectively break up the soil into small pieces. Further, the modified tiller shown in Fig. 5 includes a blade 48 which also works the soil that is turned by the mold board 21.

In the modified tiller shown in Fig. 6, the soil is worked by the blade 55, the rear end of the tiller being supported by the heel plate 54 as the tiller is drawn along the ground. In the tiller 58 as shown in Figs. 7 and 8, the hinge member serves to pivotally connect the tiller to the lower end of the arm 23, and the vertical blade 60 chops or loosens the soil that is turned by the mold board 21. In Fig. 9, there is shown a portion of a tiller which includes a blade 72 and support member 74 that coacts to work or break up the soil that has been turned by the mold board 21.

What is claimed is:

In an agricultural machine, the combination with a plow beam and a mold board carried by the beam of an inverted L-shaped member having the free end of its horizontal leg connected to the beam, an elongated tiller structure pivoted at its forward end to the free end of the other leg of said member and extending rearwardly in parallel relation to said beam adjacent the furrow forming side of the mold board, means carried by the said other leg of said member and cooperative with the pivoted end portion of the tiller structure for adjusting its other end portion vertically into proper soil working relation with respect to the furrow, the said other end portion of the tiller being upwardly curved and laterally inclined, a pair of spaced parallel plates constituting a housing projecting rearwardly from the said other end portion adjacent the lower end of the curved portion thereof and a ground surface engaging element having radially disposed arms mounted for rotation on a horizontal axis between said plates to impart an up and down movement to said tiller structure.

References Cited in the file of this patent

UNITED STATES PATENTS

| | | |
|---|---|---|
| 963,587 | Kramer | July 5, 1910 |
| 1,095,911 | Mire | May 5, 1914 |